US007965475B2

(12) United States Patent
Morino

(10) Patent No.: US 7,965,475 B2
(45) Date of Patent: Jun. 21, 2011

(54) OVERHEAT PROTECTION CIRCUIT

(75) Inventor: Kohichi Morino, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 571 days.

(21) Appl. No.: 12/100,852

(22) Filed: Apr. 10, 2008

(65) Prior Publication Data

US 2008/0278868 A1 Nov. 13, 2008

(30) Foreign Application Priority Data

May 9, 2007 (JP) ................................ 2007-124189

(51) Int. Cl.
*H02H 9/00* (2006.01)

(52) U.S. Cl. ........................................ 361/18; 361/93.8

(58) Field of Classification Search .................... 361/56, 361/93.1, 93.9, 103
See application file for complete search history.

(56) References Cited

U.S. PATENT DOCUMENTS 6,538,867 B1 * 3/2003 Goodell et al. ............. 361/91.1
2002/0149350 A1 10/2002 Koyasu
2004/0075423 A1 * 4/2004 Itabashi et al. ................ 323/282

FOREIGN PATENT DOCUMENTS

JP 2002-312044 10/2002
JP 2005-175439 6/2005

* cited by examiner

*Primary Examiner* — Jared J Fureman
*Assistant Examiner* — Angela Brooks
(74) *Attorney, Agent, or Firm* — Dickstein Shapiro LLP

(57) ABSTRACT

An overheat protection circuit of a semiconductor apparatus has an output current detecting circuit for detecting an output current of a constant voltage circuit; a temperature detector for detecting a temperature of the apparatus; an output current control circuit for controlling the output current in accordance with output of the temperature detector; a bias current source for providing a bias current for the temperature detector; and a switch for controlling the bias current from the bias current source to the temperature detector. The output current control circuit interrupts the output current when the temperature detector detects a temperature that is higher than a predetermined temperature. The output current detecting circuit and the output current control circuit may be used to control the switch to prevent oscillation of the output current in the vicinity of the predetermined temperature.

12 Claims, 4 Drawing Sheets

FIG. 2

FIRST, CONSIDER CASE 1, WHERE THE OUTPUT CURRENT IS UNDER THE PREDETERMINED CURRENT LEVEL ($I_{out} < Io0$), AND THE TEMPERATURE OF THE SEMICONDUCTOR IS UNDER THE PREDETERMINED TEMPERATURE ($T < T0$).

VA < VB

M2–M6 : OFF (THE FIRST AND SECOND TEMPERATURE DETECTOR ARE NOT CONTROLLED) ··NO OVERHEAT DETECTION

---

IN CASE 2, THE OUTPUT CURRENT IS MORE THAN THE PREDETERMINED CURRENT LEVEL ($I_{out} \geq Io0$), AND THE TEMPERATURE OF THE SEMICONDUCTOR IS STILL UNDER THE PREDETERMINED TEMPERATURE ($T < T0$).

VA < VB

M2, M4 : ON (THE FIRST AND SECOND TEMPERATURE DETECTOR ARE CONTROLLED) ··OVERHEAT DETECTION

---

IN CASE 3, THE OUTPUT CURRENT IS MORE THAN THE PREDETERMINED CURRENT LEVEL ($I_{out} \geq Io0$), AND THE TEMPERATURE OF THE SEMICONDUCTOR IS MORE THAN THE PREDETERMINED TEMPERATURE ($T \geq T0$).

VA ≥ VB

M3, M5, M6 : ON (THE FIRST AND SECOND TEMPERATURE DETECTOR ARE CONTROLLED) ··OVERHEAT DETECTION

IN CASE 3a, WHEN THE PMOS TRANSISTOR M6 TURNS ON, THE GATE POTENTIAL OF THE OUTPUT CONTROL TRANSISTOR M1 IS INCREASED. AS A RESULT, THE OUTPUT CONTROL TRANSISTOR M1 TURNS OFF.

M2, M6 : OFF

---

IN CASE 4, THE TEMPERATURE OF THE SEMICONDUCTOR IS REDUCED TO LESS THAN THE PREDETERMINED TEMPERATURE ($T < T0$).

VA < VB

M3, M5, M6 : OFF

IN CASE 4a, IF THE OUTPUT CURRENT IS MORE THAN THE PREDETERMINED CURRENT VALUE ($I_{out} \geq Io0$), THE OUTPUT LEVEL OF THE OUTPUT CURRENT DETECTING CIRCUIT 21 IS HIGH.

M2, M4 : ON (THE FIRST AND SECOND TEMPERATURE DETECTOR ARE CONTROLLED) ··OVERHEAT DETECTION

IN CASE 4b, IF THE OUTPUT CURRENT IS UNDER THE PREDETERMINED CURRENT VALUE ($I_{out} < Io0$), THE OUTPUT LEVEL OF THE OUTPUT CURRENT DETECTING CIRCUIT 21 IS LOW.

M2, M4 : OFF (THE FIRST AND SECOND TEMPERATURE DETECTOR ARE NOT CONTROLLED) ··NO OVERHEAT DETECTION

OVERHEAT PROTECTION CIRCUIT

BACKGROUND

The present invention relates generally to an overheat protection circuit. The present invention also relates to an overheat protection circuit for preventing a semiconductor apparatus, that has a constant voltage regulator, from being destroyed by overheating caused by an over output current. Furthermore, the present invention relates to an electronic device having an overheat protection circuit, and an overheat protection method.

Recently, an overheat protection circuit has been known. The purpose of the overheat protection circuit is to protect a semiconductor apparatus based on a temperature value of a semiconductor chip measured by the circuit.

The known overheat protection circuit tends to increase a consumption current so that a constant voltage regulator always provides electricity for the overheat protection circuit during operation.

The overheat protection circuit works only in the case where an electric current output by a constant voltage circuit is high. Therefore, it is a waste to provide electricity for the overheat protection circuit in a case where the output current is low.

For example, in Japanese Laid-Open Patent Publication No. 2002-312044 (Patent Document 1), an overheat detecting circuit is provided a bias current only in the case where a detected output current is more than a predetermined output current.

FIG. 4 is a schematic illustration of an embodiment described in FIG. 1 of Patent Document 1. As shown in FIG. 4, a constant voltage circuit of a power supply circuit is configured to a reference voltage Vref, an error amplification circuit 1, an output control transistor Q11, a transistor Q13, a resistance R13 and output voltage detecting resistances R11, R12.

An output voltage Vo from the constant voltage circuit is divided by the resistances R11, R12.

The error amplification circuit 1 amplifies the difference between the divided voltage and the reference voltage Vref, and controls a base current of the transistor Q13 so that the difference becomes 0V.

Because the collector of transistor Q13 is connected to a base of the output control transistor Q11, the error amplification may control the output control transistor Q11 through the transistor Q13.

The transistor Q12 and the output control transistor Q11 make a multi-collector structure. As the collector current of the transistor Q12 is proportional to the collector current of the output control transistor Q11, the output current can be detected indirectly by detecting the collector current value of the transistor Q12.

The collector current of the transistor Q12 is supplied to the resistance R14. Thus, it causes a voltage drop in the resistance R14.

The ends of the resistance R14 are connected between the base and the emitter of the transistor Q14.

The collector of the transistor Q14 is connected to the bias circuit 2. The emitter of the transistor Q14 is connected to a ground electrical current potential.

When the voltage drop in the resistance R14 exceeds a base threshold voltage of the transistor Q14, the transistor Q14 turns on so that the collector current of the transistor Q12 is increased. Therefore, the bias circuit 2 is electrified and operated.

Since the output of the bias circuit 2 is applied to the overheat detecting circuit 3, the overheat detecting circuit 3 is started by the bias circuit 2.

The overheat detecting circuit 3 has two outputs.

One output of the overheat detecting circuit 3 is connected to the base of the transistor Q13. The second output of the overheat detecting circuit 3 is connected to a CPU that controls a whole circuit.

When the overheat detecting circuit 3 detects an overheat state of the semiconductor apparatus, the level of the first output of the overheat detecting circuit 3 becomes low. Accordingly, the base voltage of the transistor Q13 is reduced, and the transistor Q13 turns off.

Because of this, supply of a base electric current of the output control transistor Q11 stops, and the output control transistor Q11 turns off. Thus, the constant voltage circuit stops power supply to a load.

The second output of the overheat detecting circuit 3 is input into the CPU. The CPU performs a suitable processing, for example a load is reduced, according to an overheat signal.

SUMMARY OF INVENTION

Applicant investigated the system shown in Japanese Patent Laid-Open No. 2002-312044 and found problems with the way in which it operates. That is, in operation, the transistor Q13 is turned off by one output when the overheat detecting circuit 3 detects the overheat state.

Then the output control transistor Q11 turns off, such that the output current of the constant voltage regulator is interrupted. Therefore, the collector current of the transistor Q12, which is in proportion to the collector current of the output control transistor Q11, is interrupted.

Hence, the transistor Q14 turns off because there is no voltage drop in the resistance R14, and the supply of an electric current to the bias circuit 2 is interrupted. The overheat detecting circuit 3 stops working as the bias supply to the overheat detecting circuit 3 is discontinued.

Because of this, as the first output (low level) from the overheat detecting circuit 3 is cancelled immediately, the transistor Q13 turns on again. The constant voltage circuit starts to supply the output current again, because the base current is supplied to the output control transistor Q11.

However, if the load connected to the constant voltage circuit is the same, an over current begins to flow again. Same as above, the bias circuit 2 is operated such that the transistor Q14 is turned on. As a result, the overheat signal is output by the overheat detecting circuit 3.

By repeating this cycle, a condition occurs in which the output current continues intermittently at high speed. In other words, "oscillation movement" occurs, and the circuit cannot duly protect the semiconductor apparatus against overheating.

In the related art, the second output of the overheat detecting circuit 3 is sent to the CPU to prevent this state. Some measures to lighten a state of the load of the constant voltage circuit must be performed by the CPU.

In other words, Applicant discovered that there is a problem with the FIG. 4 system in that there is a need to set up the CPU. Overheat protection cannot be performed by the FIG. 4 system without the CPU.

The present invention is directed to a semiconductor apparatus that satisfies above need. The present invention is also directed to an electronics apparatus and a control method. The present invention relates to an overheat protection circuit that can interrupt an output current from a constant voltage circuit surely until an overheat state of a semiconductor apparatus is solved, and without special control circuits such as a CPU.

To achieve the above object, an overheat protection circuit of a semiconductor apparatus may be provided with: an output current detecting circuit for detecting an output current of a constant voltage circuit; a temperature detector for detecting a temperature of the semiconductor apparatus; an output current control circuit for controlling the output current in accordance with an output of the temperature detector; a bias current source for providing a bias current for the temperature detector; and a switch for controlling the bias current from the bias current source to the temperature detector; wherein the output current control circuit interrupts the output current when the temperature detector detects a temperature that is higher than a predetermined temperature. In a preferred embodiment of the invention, the output current detecting circuit and the output current control circuit control the switch to prevent oscillation of the output current in the vicinity of the predetermined temperature.

Preferably, the switch turns the bias current off when the output current detecting circuit detects a current value that is less than a predetermined current value and the temperature detector detects a temperature of the semiconductor device that is less than the predetermined temperature, and the switch turns the bias current on when the output current detecting circuit detects a current value that is greater than the predetermined current value, and the switch keeps the bias current on for the temperature detector until the temperature detector detects a temperature that is less than the predetermined temperature.

As a result of this arrangement, a state in which the output current continues intermittently at high-speed, namely "oscillation movement," can be avoided without a special control circuit such as a CPU, and power consumption of the bias current is reduced.

Preferably, the switch turns the bias current off when the temperature detector detects a temperature that is less than the predetermined temperature and when the output current detecting circuit detects a current value that is less than the predetermined current value.

As a result of this arrangement, the overheat function can be performed surely so that there is no malfunction by noise when the bias current is not supplied.

Preferably, the temperature detector includes a first temperature detector and a second temperature detector, and the first and second temperature detectors have different temperature-voltage characteristics; and the bias current source includes first and second bias current sources, and the first bias current source provides a first bias current for the first temperature detector, and the second bias current source provides a second bias current for the second temperature detector; and the controlling switch includes a first switch for turning on/off the first bias current and a second switch for turning on/off the second bias current, and outputs of the first and second temperature detectors are input to the output current control circuit, and the first switch is connected between the first temperature detector and a power source, and the second switch is connected between the second temperature detector and a ground electrical potential.

Preferably, each of the first switch and the second switch have two switch elements comprising control electrodes connected in parallel.

Preferably, one switch element of the two switch elements is turned on/off by the output of the output current detecting circuit, and the other switch element of the two switch elements is turned on/off by the output of the output current control circuit.

As a result of this arrangement, the control circuit of the switch can be constructed simply.

Preferably, a sub bias current source always provides a sub bias current that is less than the first bias current for the first temperature detector.

As a result of this arrangement, the overheat protection circuit can be performed stably so that there is no malfunction by noise.

Preferably, an electronic apparatus comprises the overheat protection circuit.

As a result of this arrangement, the electronic apparatus can be operated stably, with no malfunction by noise, and power consumption can be reduced.

Preferably, the electronic apparatus is one of a mobile electronic apparatus, a voltage regulator, a DC-DC converter, a battery pack, an electronic device for an automobile, and a household electrical appliance.

The present invention also relates to a method for preventing overheating, including the steps of: discontinuing a bias current when an output current detecting circuit detects a current that is less than a predetermined current value and a detected temperature of a semiconductor apparatus is less than a predetermined temperature; providing the bias current when the output current detecting circuit detects a current value that is greater than the predetermined current value; interrupting an output current when the output current detecting circuit detects a current value that is greater than the predetermined current value and the temperature detector detects a temperature that is greater than the predetermined temperature; and maintaining the bias current for the temperature detector until the temperature detector detects a temperature that is less than the predetermined temperature.

As a result of this arrangement, a state in which the output current continues intermittently at high-speed, namely "oscillation movement," can be avoided without a special control circuit such as a CPU, and power consumption of the bias current is reduced.

According to the present invention, power consumption can be reduced because the bias current is supplied in the temperature detector through the switch when the output current is more than the predetermined current value.

Furthermore, a state where the output current continues intermittently at high-speed can be avoided without a special control circuit such as a CPU, so that the bias current continues to be supplied to the temperature detector until temperature falls, after having detected overheat of the semiconductor apparatus.

In addition, the overheat function can be performed stably so that the temperature detector is hardly affected by noise, because a sub bias current, which is less than the bias current, is always supplied to the temperature detector. And more, an outbreak of noise, which could otherwise occur when the regular bias current is supplied, can be reduced.

In describing preferred embodiments illustrated in the drawing, specific terminology is employed for purpose of clarity. However, the disclosure of this patent specification is not intended to be limited to the specific terminology so used and it is to be understood that substitutions for each specific element can include any technical equivalents that operate in a similar manner.

BRIEF DESCRIPTION OF DRAWINGS

FIG. 2 shows relations of the output current value, semiconductor temperature, the electric potential A of connecting node A (VA), the electric potential B of connecting node B (VB), the on/off states of the switches, and the states of detecting overheat or not.

DETAILED DESCRIPTION OF PREFERRED EMBODIMENTS

Figure 1:
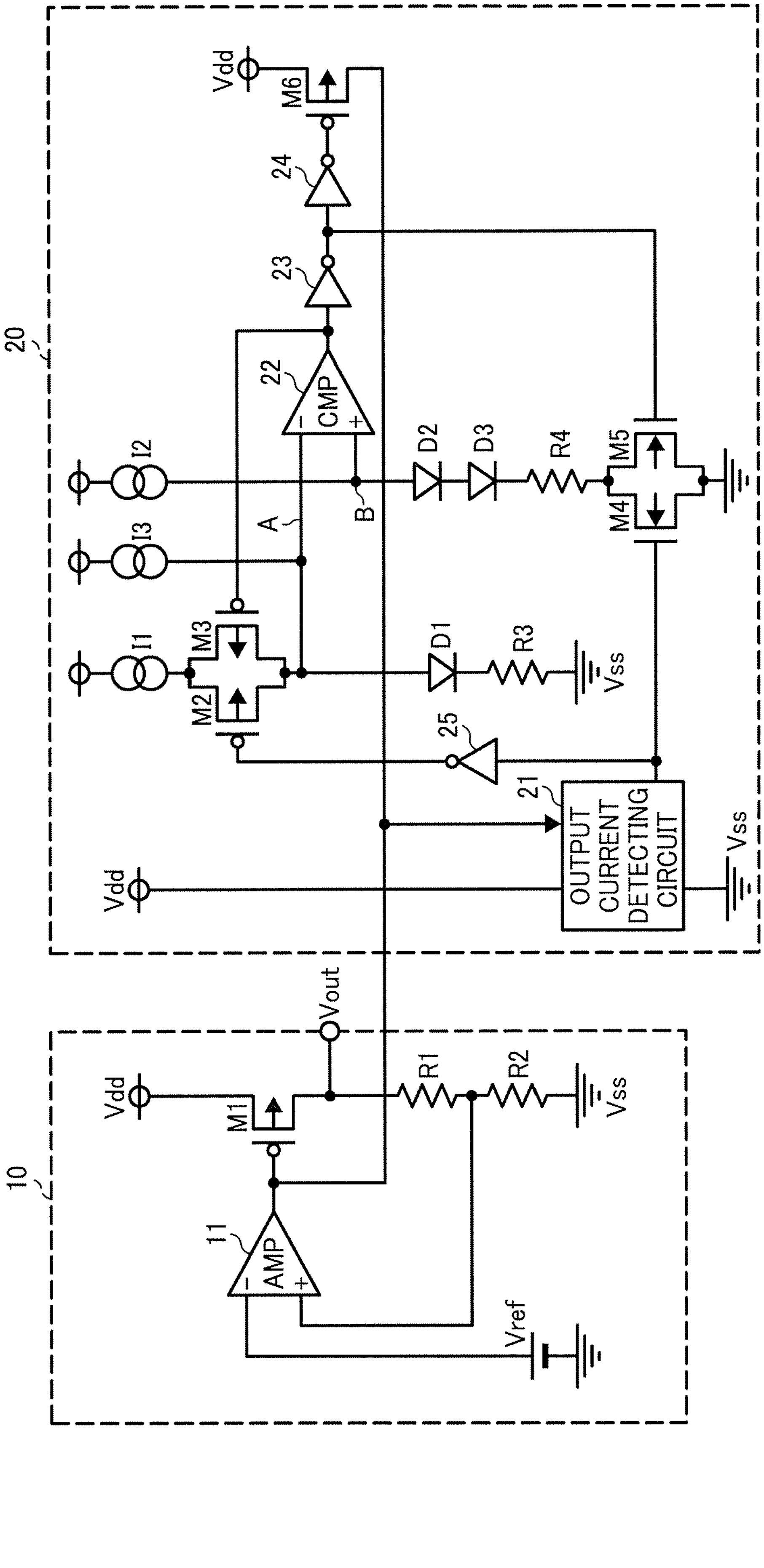
FIG. 1 is a circuit diagram illustrating a constant voltage circuit having an overheat protection circuit according to an embodiment of the present invention.

Referring now to the drawings, wherein like reference numerals designate identical or corresponding parts throughout the several views thereof, and in the first instance to FIG. 1, a constant voltage circuit according to exemplary embodiments of the present invention is described.

FIG. 1 is a circuit diagram illustrating a constant voltage circuit having an overheat protection circuit according to an embodiment of the present invention.

FIG. 1 shows a constant voltage circuit 10 and an overheat protection circuit 20.

The constant voltage circuit has a reference voltage Vref, an error amplification circuit 11, an output control transistor M1, and output voltage detecting resistances R1, R2.

An output voltage Vout from the constant voltage circuit is divided by the resistances R1, R2.

The error amplification circuit 11 amplifies the difference between the divided voltage and the reference voltage Vref, and controls a gate of the output transistor M1 such that the difference becomes 0V.

The overheat protection circuit 20 has an output current detecting circuit 21, a comparator 22, inverters 23 to 25, bias current sources I1 to I3, PMOS transistors M2, M3, M6, NMOS transistors M4, M5, diodes D1 to D3, and resistances R3, R4.

A gate voltage of the output control transistor M1 is input into the output current detecting circuit 21. An output of the output current detecting circuit 21 is connected to a gate of NMOS transistor M4 and an input of the inverter 25.

Further, an output of the inverter 25 is connected to a gate of the PMOS transistor M2.

The diode D1 and the resistance R3 are connected in series. They comprise a first temperature detector.

The other terminal of the resistance R3 is connected to a ground voltage Vss.

The other terminal (an anode) of the diode D1 is connected to a common drain of the PMOS transistor M2 and PMOS transistor M3. The PMOS transistors M2, M3 are connected in parallel and comprise a first switch means.

The sources of the PMOS transistor M2 and the PMOS transistor M3 are connected together.

The PMOS transistor M2 is a first switch element, and the PMOS transistor M3 is a second switch element.

The first bias current source is connected between the first switch means (the first switch element M2, the second switch element M3) and a power source Vdd to supply the first bias current in the first temperature detector (the diode D1, the resistance R3).

A node A, that is, the anode of the diode D1 and the first switch means, is connected to an inverting input terminal of the comparator 22.

In addition, a gate of the second switch element M3 is connected to the output terminal of the comparator 22.

The sub bias current source I3 is connected between the power source Vdd and the anode of the diode D1 to provide the sub bias current for the first temperature detector (includes the diode D1 and the resistance R3).

The current value of the sub bias current source I3 is much smaller than the current value of the first bias current source I1.

The sub bias current can stabilize the electric potential (VA) of the node A so that a minute sub bias current is supplied for the first temperature detector, when the first switch means is turned off (that is, when both the first switch element M2 and the second switch element M3 are turned off). Therefore, the effect of noise from the outside can be reduced.

Even more particularly, since the quantity of the electric potential (VA) changes when the first switch mean turns on (that is, when both the first switch element M2 and the second switch element M3 turn on) can be become small, it can be performed stably.

The second detector is constructed of the diodes D2 and D3 and the resistance R4. The diodes D2 and D3 are connected to the resistance R4 in series.

Another terminal of the resistance R4 forms a common drain of the NMOS transistors M4, M5. The NMOS transistors M4, M5 are connected in parallel and form the second switch means.

The sources of the NMOS transistors M4 and M5 are connected together and to the ground potential Vss.

The NMOS transistor M4 is a third switch element, and the NMOS transistor M5 is a fourth switch element.

The second bias current source I2 is connected between the other terminal (an anode) of the diode D2 and the power source Vdd to provide the second current for the second detector (includes the diodes D2 and D3 and the resistance R4).

The anode of the diode D2 and a node B of the second current source I2 are connected to the non-inverting input of the comparator 22.

A gate of the fourth switch element M5 (NMOS transistor) receives a signal that is inverted from the output of comparator 22 by the inverter 23.

In addition, the output of the inverter 23 is connected to the input of the inverter 24.

An output of the inverter 24 is connected to a gate of the PMOS transistor M6.

A source of the PMOS transistor M6 is connected to the power source Vdd. A drain of the PMOS transistor M6 is connected to the gate of the output control transistor M1.

An output current control circuit is formed of the comparator 22, the inverters 23 and 24, and the PMOS transistor M6.

In operation, the output current detecting circuit 21 detects an output current generated by a gate voltage of the output control transistor M1. The output current detecting circuit 21 outputs a high-level output signal when the output current is more than a predetermined current level and a low-level output signal when the output current is under the predetermined current level.

First, consider Case 1, where the output current is under the predetermined current level, and the temperature of the semiconductor is under the predetermined temperature.

The third switch element M4 turns off when the output signal of the output current detecting circuit 21 is low level, that is, when the output current is less than the predetermined current value.

In addition, the first switch element M2 turns off as the output level of the inverter 25 becomes high.

In the above condition, the second switch element M3 and the fourth switch element M5 are turned off.

In this case, when the temperature of the semiconductor apparatus is low, the first bias current source I1, the second bias current source I2, the sub bias current source I3 and the resistances R3 and R4 are set effectually so that the electric potential A is less than the electric potential B (namely, VA<VB).

Because the level of the output of the comparator 22 is high, the second switch element M3 is turned off.

In addition, the fourth switch element M5 is turned off when the level of the output of inverter 23 is low.

In other words, the first switch element M2 and the second switch element M3 of the first switch means, and the third switch element M4 and the fourth switch element M5 of the second switch means are turned off entirely when the output current is less than the predetermined current value and the temperature of the semiconductor apparatus is low. Accordingly, the first bias current is not provided to the first temperature detector and the second bias current is not provided to the second temperature detector.

In this case, the electric potential A that is the input voltage potential of the comparator 22 is a little lower than when the first switch means (the first switch element M2, the second switch element M3) is turned on. The sub bias current, which is provided to the first temperature detector from the sub bias current source I3, is very much less than the current value of the first bias current source I1.

The node B raises to the voltage of power source Vdd substantially when the second temperature detector is disconnected from the ground potential Vss by the second switch means (the third switch element M4, the fourth switch element M5).

Namely the electric potential A is maintained to be less than the electric potential B. Therefore, even if the second switch element M3 and the fourth switch element M5 are turned off, the output state of the comparator 22 does not change, and the output level of the inverter 24 is high. Accordingly, operation of the output control transistor M1 is not affected while the PMOS transistor M6 is turned off.

In Case 2, the output current is more than the predetermined current level, and the temperature of the semiconductor is still under the predetermined temperature.

When the output current is increased and exceeds the predetermined current value, the output signal level of the output current detecting circuit 21 is high.

As a result, the third switch element M4 is turned on, and the second bias current of the second bias current source I2 is provided to the second temperature detector.

In addition, the first switch element M2 turns on as the output level of the inverter 25 becomes low. Then the first bias current of the first bias current source I1 is provided to the first temperature detector.

Because the temperature does not reach the predetermined temperature in this condition, the relationship between the electric potential A (VA) and the electric potential B (VB) is maintained in the state where the electric potential A is less than the electric potential B (namely, VA<VB). Accordingly, the output level of the comparator 22 is high.

When the temperature of the semiconductor apparatus rises, the electric potential B (VB) falls rapidly because the second temperature detector has more diodes than the first temperature detector.

In Case 3, the output current is more than the predetermined current level, and the temperature of the semiconductor is more than the predetermined temperature.

When the temperature of the semiconductor apparatus is more than the predetermined temperature, the electric potential A becomes more than the electric potential B (VA>VB).

As a result, the output level of the comparator 22 becomes low, such that both the second switch element M3 and the fourth switch element M5 are turned on.

In addition, the PMOS transistor M6 is turned on as the inverter 24 output level is low.

In Case 3a, when the PMOS transistor M6 turns on, the gate potential of the output control transistor M1 is increased. As a result, the output control transistor M1 turns off.

As a result of this, further increases in the temperature of the semiconductor apparatus can be stopped because the output current is interrupted.

When the output current is interrupted, the output level of the output current detecting circuit 21 becomes low, and both the first switch element M2 and the third switch element M4 are turned off.

Because the second switch element M3 and the fourth switch M5 are already turned on, the bias currents of the first and second temperature detectors are still provided. Accordingly, the first and the second temperature detectors continue to detect the overheating.

Therefore the detection of temperature is not stopped as soon as overheating is detected. This is an advantage over the prior art. Moreover, a state where the output current continues intermittently at high-speed, namely "oscillation movement," can be avoided without a special control circuit such as a CPU.

In Case 4, the temperature of the semiconductor is reduced to less than the predetermined temperature.

When the temperature of the semiconductor apparatus is reduced to less than the predetermined temperature, the electric potential A becomes less than the electric potential B (VA<VB), and the output level of the comparator 22 is high again.

Then both of the switch element M3 and the fourth switch element M5 are turned off.

The PMOS transistor M6 is turned off as the output level of the inverter 24 is high.

When the PMOS transistor M6 is turned off, the gate potential of the output control transistor M1 is controlled by the error amplification circuit 11. And the constant voltage circuit 10 supplies the constant current.

In Case 4a, if the output current is more than the predetermined current value, the output level of the output current detecting circuit 21 is high. Accordingly, the first and second temperature detectors are supplied the bias current from the first and second bias current sources (I1, I2) immediately, as the first switch means and second switch means are turned on. In other words, the first and second temperature detectors quickly detect an overheat condition.

In Case 4b, if the output current is under the predetermined current value, the output level of the output current detecting circuit 21 is low. The first switch element M2 and the third switch element M4 are turned off. There is no detection of overheating in Case 4b, as the first and second temperature detectors are not supplied the bias current from the first and second bias current sources I1, I2. In other words, Case 4b represents a return to the first state (Case 1).

FIG. 2 shows relations of the output current value, semiconductor temperature, the electric potential A of connecting node A (VA), the electric potential B of connecting node B (VB), on/off states of the switches, and the states of detecting overheat or not, with respect to Cases 1 through 4a.

In the illustrated apparatus, the first switch means is connected in series with the first temperature detector, and the second switch means is connected in series with the second temperature detector.

The first switch means includes the first switch element and the second switch element. The second switch means includes the third switch element and the fourth switch element.

The first switch elements of each switch means (that is, the first switch element and the third switch element) are controlled by the output of the output current detecting circuit 21.

The other switch element of each switch means (the second switch element and the fourth switch element) is controlled by the output of the output current control circuit.

Accordingly, the illustrated apparatus can operate without oscillation without using a complex logical circuit to control the switches.

The overheat protection circuit can be applied to electric apparatuses such as portable electric devices (for example, cell phones), voltage regulators, DC-DC converters, battery packs, and electric apparatuses for cars, and household electrical appliances. As a result of this, power consumption can be reduced. Moreover, special control circuits such as a CPU are not needed. Furthermore, electric apparatuses that have the overheat protection circuit can interrupt the output current from the constant voltage circuit surely and perform stably until the semiconductor apparatuses are no longer overheated.

As mentioned earlier, the present invention can be applied to a wide variety of electric apparatuses in various fields.

Figure 3:
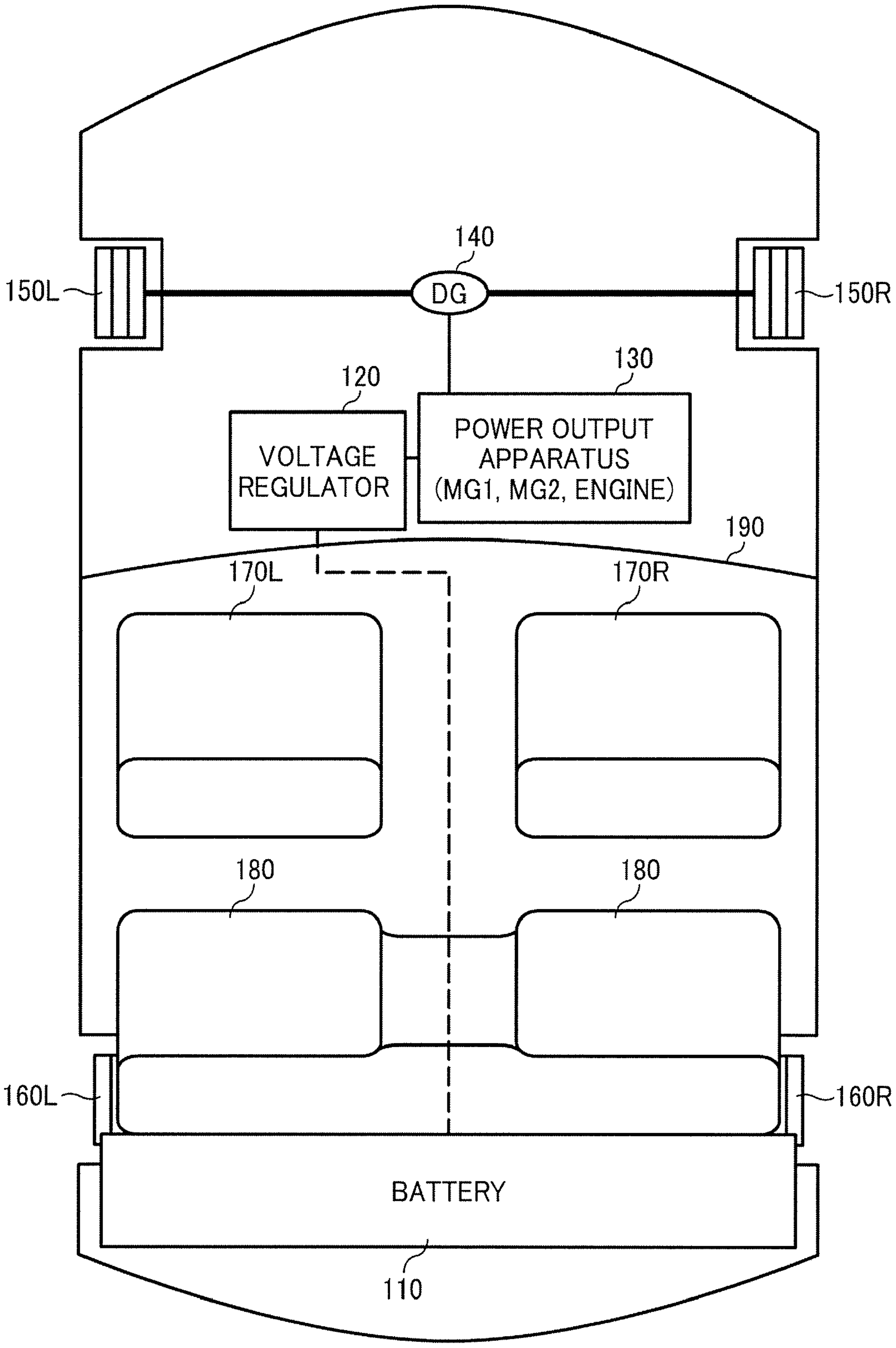
FIG. 3 is a block diagram of a hybrid automobile using a voltage regulator and an overheat protection circuit.
Figure 4:
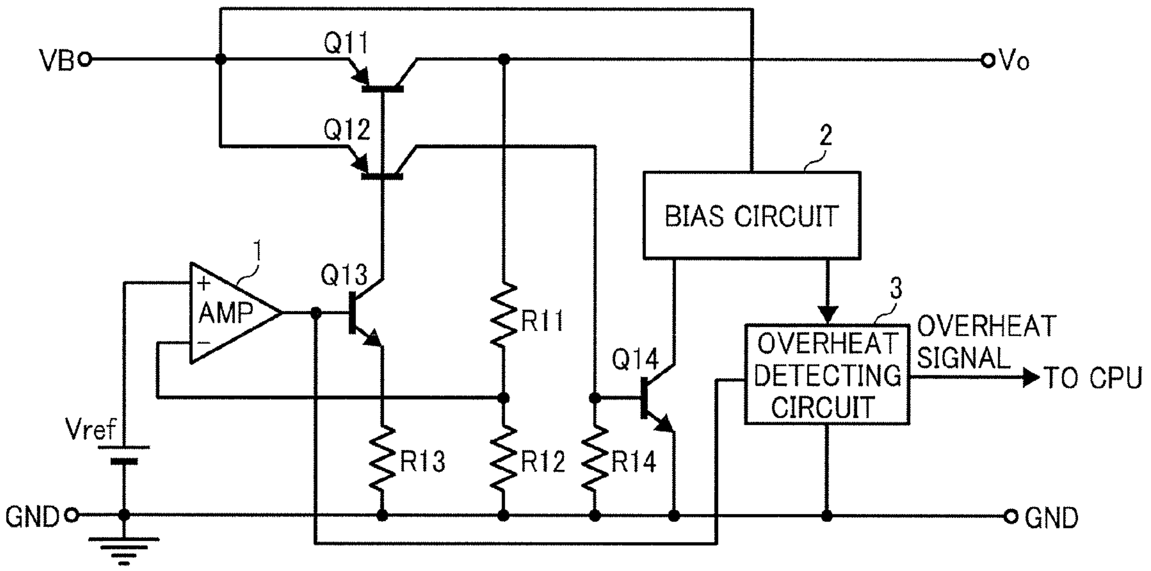
FIG. 4 PRIOR ART
FIG. 4 is a schematic illustration of a conventional embodiment having an overheat protection function.

FIG. 3 shows an embodiment where the overheat protection circuit is applied to a hybrid automobile of the type described in Japanese Patent Laid-Open No. 2005-175439 bulletin.

FIG. 3 is a block diagram showing an example of the present invention in a hybrid automobile, with a voltage regulator that has the overheat protection circuit.

According to FIG. 3, the hybrid automobile has a battery 110, a voltage regulator 120 with an overheat protection circuit in accordance with the present invention, a power output apparatus 130, differential gears DG 140, front wheels 150L and 150R, rear wheels 160L and 160R, front seats 170L and 170R, a rear seat 180, and a dashboard 190. The basic operation of the automobile, but without the present invention, is illustrated in Japanese Patent Laid-Open No. 2005-175439 bulletin.

The battery 110 is connected to the voltage regulator 120 by an electric cable. The battery 110 supplies a DC voltage to the voltage regulator 120, and the DC voltage of the voltage regulator 120 charges the battery 110.

The voltage regulator 120 is connected to the power output apparatus 130 by electric cable. The power output apparatus 130 is coupled to the differential gear DG 140.

The voltage regulator 120 boosts the DC voltage of the battery 110. The voltage regulator 120 alternates a boosted DC voltage to an AC voltage. Moreover, the voltage regulator 120 controls an operation of two motor generators MG1 and MG2 that are included in the power output apparatus 130. In addition, the voltage regulator 120 alternates an AC voltage that is generated by the motor generator to a DC voltage, and charges the battery 110 by the DC voltage.

The voltage regulator 120 is included with an overheat protection circuit constructed in accordance with the present invention. As a result of this, power consumption can be reduced. Moreover, special control circuits such as a CPU are not needed. Furthermore, electric apparatuses that have the overheat protection circuit can interrupt the output current from the constant voltage circuit surely and perform stably until leaving an overheated state.

The entire disclosure of Japanese Patent Application No. 2007-124189, filed May 9, 2007, is incorporated herein by reference.

The above description and drawings are only to be considered illustrative of exemplary embodiments, which achieve features and advantages of the present invention. Modification and substitutions to specific conditions and structures can be made without departing from the spirit and scope of the present invention. Accordingly, the invention is not to be limited by the foregoing description and drawings, but is only limited by the scope of the appended claims.

What is claimed is:

1. An overheat protection circuit of a semiconductor apparatus having a constant voltage circuit, the overheat protection circuit comprising:

an output current detecting circuit for detecting an output current of the constant voltage circuit;

a temperature detector for detecting a temperature of the semiconductor apparatus;

an output current control circuit for controlling the output current in accordance with an output of the temperature detector;

a bias current source for providing a bias current for the temperature detector; and a switch for controlling the bias current from the bias current source to the temperature detector, said switch being connected between the temperature detector and the bias current source;

wherein the output current control circuit interrupts the output current when the temperature detector detects a temperature that is higher than a predetermined temperature, and wherein the output current detecting circuit and the output current control circuit control the switch to prevent oscillation of the output current in the vicinity of the predetermined temperature.

2. The overheat protection circuit as claimed in claim 1, wherein the switch turns the bias current off when the output current detecting circuit detects a current value that is less than a predetermined current value and the temperature detector detects a temperature of the semiconductor device that is less than the predetermined temperature, and wherein the switch turns the bias current on when the output current detecting circuit detects a current value that is greater than the predetermined current value, and wherein the switch keeps the bias current on for the temperature detector until the temperature detector detects a temperature that is less than the predetermined temperature.

3. The overheat protection circuit as claimed in claim 1, wherein the switch turns the bias current off when the temperature detector detects a temperature that is less than the predetermined temperature and when the output current detecting circuit detects a current value that is less than the predetermined current value.

4. The overheat protection circuit as claimed in claim 1, wherein the temperature detector includes a first temperature detector and a second temperature detector, and wherein the first and second temperature detectors have different temperature-voltage characteristics;

wherein the bias current source includes first and second bias current sources, and wherein the first bias current source provides a first bias current for the first temperature detector, and wherein the second bias current source provides a second bias current for the second temperature detector;

wherein the controlling switch includes a first switch for turning on/off the first bias current and a second switch for turning on/off the second bias current, and wherein outputs of the first and second temperature detectors are input to the output current control circuit, and the first switch is connected between the first temperature detector and a power source, and the second switch is connected between the second temperature detector and a ground electrical potential.

5. The overheat protection circuit as claimed in claim 4, wherein each of the first switch and the second switch have two switch elements comprising control electrodes connected in parallel.

6. The overheat protection circuit as claimed in claim 5, wherein one switch element of the two switch elements is turned on/off by the output of the output current detecting circuit, and the other switch element of the two switch elements is turned on/off by the output of the output current control circuit.

7. The overheat protection circuit as claimed in claim 4, wherein a sub bias current source always provides a sub bias current that is less than the first bias current for the first temperature detector.

8. An electronic apparatus comprising the overheat protection circuit as recited in claim 1.

9. The electronic apparatus as claimed in claim 8, wherein the electronic apparatus is one of a mobile electronic apparatus, a voltage regulator, a DC-DC converter, a battery pack, an electronic device for an automobile, and a household electrical appliance.

10. A method of operating an overheat protection circuit, wherein the overheat protection circuit comprises:

a temperature detector for detecting a temperature of a semiconductor apparatus including a constant voltage regulator;

an output current detecting circuit for detecting an output current of the constant voltage regulator;

an output current control circuit for controlling the output current in accordance with an output of the temperature detector;

a bias current source for providing a bias current for the temperature detector; and a switch for controlling the bias current for the temperature detector from the bias current source in accordance with outputs of the output current detecting circuit and the output of the output current control circuit, the switch being connected between the temperature detector and the bias current source; and wherein the method comprises:

(a) stopping the bias current using the switch when the output current detecting circuit detects a current value that is less than a predetermined current value and a detected temperature of the semiconductor apparatus is less than a predetermined temperature;

(b) providing the bias current through the switch when the output current detecting circuit detects a current value that is greater than the predetermined current value;

(c) interrupting the output current when the output current detecting circuit detects a current value that is greater than the predetermined current value and the temperature detector detects a temperature that is greater than the predetermined temperature; and (d) maintaining the bias current for the temperature detector until the temperature detector detects a temperature that is less than the predetermined temperature.

11. An overheat protection circuit of a semiconductor apparatus, the overheat protection circuit comprising:

an output current detecting circuit for detecting an output current of a constant voltage circuit;

a temperature detector for detecting a temperature of the semiconductor apparatus;

an output current control circuit for controlling the output current in accordance with an output of the temperature detector;

a bias current source for providing a bias current for the temperature detector; and a switch turning on/off the bias current from the bias current source to the temperature detector, said switch being connected between the temperature detector and the bias current source;

wherein the output current control circuit interrupts the output current when the temperature detector detects a temperature that is higher than a predetermined temperature.

12. A method for preventing overheating, comprising:

discontinuing a bias current using a switch connected between a source of the bias current and a temperature detector when an output current detecting circuit detects a current that is less than a predetermined current value and a detected temperature of a semiconductor apparatus is less than a predetermined temperature;

providing the bias current through the switch when the output current detecting circuit detects a current value that is greater than the predetermined current value;

interrupting an output current when the output current detecting circuit detects a current value that is greater than the predetermined current value and the temperature detector detects a temperature that is greater than the predetermined temperature; and maintaining the bias current for the temperature detector until the temperature detector detects a temperature that is less than the predetermined temperature.

* * * * *